Patented June 18, 1940

2,205,116

UNITED STATES PATENT OFFICE 2,205,116

EXPLOSIVE

Willi Brün, Bridgeport, Conn., assignor to Remington Arms Company, Inc., a corporation of Delaware No Drawing. Application June 3, 1938,
Serial No. 211,567

16 Claims. (Cl. 52—5)

This invention relates to the production of certain new and hitherto unknown chemical compounds, and uses for such compounds. Such compounds are oxygen deficient, and have sufficient affinity for oxygen to render them useful as fuels in explosive compositions, particularly ammunition primers and primary detonators.

The present application is a continuation-in-part of applicant's prior co-pending application, Serial No. 116,350, filed December 17, 1936.

The novel compounds are salts of certain derivatives of phthalic acid; more specifically, salts of 4-nitro phthalic acid, and double salts of 4-nitro phthalic acid and nitric acid.

The invention comprises the discovery of four different simple lead salts of 4-nitro phthalic acid, namely, a normal salt, a mono-basic salt, a di-basic salt, and a tri-basic salt; also di- and tri-basic lead double salts of 4-nitro phthalic acid and nitric acid.

In the preparation of the normal salt, the lead nitrate solution, 5 grams of lead nitrate in 50 cc. of water, is preferably added to the solution of the acid, which solution comprises 2.29 grams of 4-nitro phthalic acid in 42 cc. of one-half normal sodium hydroxide and 65 cc. of water, at a temperature of about 90° C. The yield is 4.15 grams of a salt which is white in color, of low gravimetric density, and forms in thin plates with irregular edges. Its lead content is 47%, approaching the theoretical lead content (47.71%) of the normal lead salt of the acid of the formula $C_6H_3NO_2(COO)_2Pb$—$H_2O$. This salt has been maintained at a temperature of 100° C. for a period of five days without loss of water of crystallization.

It will be noted that the quantity of sodium hydroxide used is somewhat in excess of the quantity theoretically required to neutralize the specified quantity of 4-nitro phthalic acid. The specified quantity was determined by titration. It is probable that the excess acidity (as well as the discrepancy between actual and theoretical lead content of some of the salts to be described) is due to impurities (such as unnitrated phthalic acid) in the 4-nitro phthalic acid. While this acid can be secured in small amounts from the manufacturers of fine chemicals, it is not made in quantity and does not have an extensive commercial use. Its preparation in a pure form apparently has not been perfected.

The normal salt when ignited burns rather slowly with the evolution of considerable smoke and a substantial increase in volume, being similar in this respect to the mercury sulphocyanate used in certain fireworks.

The mono-basic salt may be prepared as follows:

A solution of 2.29 grams of 4-nitro phthalic acid in 85 cc. of one-half normal sodium hydroxide is added to a solution of 10 grams of lead nitrate in 100 cc. of water at a temperature of about 90° C. There results a precipitate of 6.6 grams of a nearly white but slightly cream colored substance in small heavy cubical crystals. The lead content of this precipitate is 60.8%, approximating the theoretical lead content (63%) of the mono-basic lead salt of the acid having the formula $C_6H_3NO_2(COO)_2Pb$—$Pb(OH)_2$.

In the preparation of the di-basic salt, a solution was prepared containing 2.29 grams of 4-nitro phthalic acid and 2.4 grams of sodium hydroxide in 120 cc. of water. 9.9 grams of lead nitrate were dissolved in 100 cc. of water, and both solutions brought to a temperature of about 90° C. The lead nitrate solution was dropped into the sodium hydroxide solution, resulting in a precipitate of 7.7 grams of a coarse crystalline material having a cream color. Its lead content is about 68.25%, approximating the theoretical lead content of a di-basic lead salt of 4-nitro phthalic acid of the formula $C_6H_3NO_2(COO)_2Pb$—$2Pb(OH)_2$. It contains no nitrate radical, and is thus substantially identified as a simple di-basic salt of the above formula.

If in the procedure outlined for the preparation of the di-basic salt the second solution contains 15 grams of lead nitrate, instead of the 9.9 grams theoretically necessary for the formation of a simple di-basic salt, and the nitro phthalic-sodium hydroxide solution is dropped into the lead nitrate solution so that an excess of lead nitrate is maintained, there results a precipitate of 10.6 grams of dense, cream colored, coarsely crystalline material. Its physical appearance does not differ substantially from that of the di-basic salt above described but its lead content is only about 64.6%, and its nitrate content as determined by a "nitron" reagent indicates that it contains slightly less than 24% of lead nitrate. It thus appears to be a di-basic lead nitro phthalate-lead nitrate of the formula $C_6H_3NO_2(COO)_2Pb$—$2Pb(OH)_2$—$Pb(NO_3)_2$.

The theoretical lead content of this compound is 67.5%, and its theoretical lead nitrate content is 26.9%. If in its preparation as above described an allowance is made for impurities in the 4-nitro phthalic acid, the yield is improved and the lead analysis of the product more nearly approaches the theoretical.

A simple tri-basic salt is prepared as follows:

2.29 grams of 4-nitro phthalic acid are dissolved with 3.2 grams of sodium hydroxide in 160 cc. of water; 13.2 grams of lead nitrate are dissolved in 100 cc. of water; and the two solutions brought to a temperature of about 90° C. The lead nitrate solution is then dropped into the sodium hydroxide-nitro phthalic acid solution, and there results a precipitate of fluffy crystals in the form of needles and bars, which when wet are of a yellow color with a greenish cast but upon drying become white. The yield is 9.5 grams (theoretical yield 11.4 grams). It contains no nitrate. When a flame is applied to the edge of a cake of the material it burns slowly through the mass with very little flame or smoke and the emission of few sparks; when such a cake is pulverized it burns somewhat more rapidly but without flame. The method of preparation and the yield indicate that it is a simple tri-basic lead salt of 4-nitro phthalic acid of the formula $C_6H_3NO_2(COO)_2Pb—3Pb(OH)_2$.

If in the procedure outlined for the preparation of the simple tri-basic salt 20 grams of lead nitrate is used and the nitro phthalic acid-sodium hydroxide solution is dropped into the lead nitrate solution there results a precipitate of 13.8 grams (theoretical 14.7 grams) of small heavy cubical crystals which are cream colored both when wet and when dry and contain a substantial amount of the nitrate radical. When a mass of this precipitate is ignited it burns quite rapidly with the emission of a shower of sparks. The ingredients used in its preparation, the yield and the nitrate content, indicate that it is a tri-basic lead double salt of 4-nitro phthalic acid and nitric acid of the formula $$C_6H_3NO_2(COO)_2Pb—3Pb(OH)_2—Pb(NO_3)_2$$

If the same procedure is followed using 15 grams of lead nitrate a precipitate is secured which contains 70.4% of lead and 10.55% of lead nitrate; it is obviously a mixture of the simple tri-basic salt and the double tri-basic salt.

The described simple and double salts, particularly the mono- and di-basic simple and the di- and tri-basic double, when ignited by heat or percussion in the presence of air or an oxygen yielding material burn quite rapidly, and by reason of this property they are useful as fuel ingredients of deflagrating explosive compositions, particularly ammunition primers and primary detonators. For the purpose of ammunition priming, they may be used in conjunction with any one or more of a number of explosive combustion initiating ingredients, such as normal or basic lead styphnate, diazodinitrophenol, mercury fulminate, normal and basic lead azide, basic lead picrate, the lead salts of di- and tri-nitro benzol, the lead salts of dinitro-ortho-cresol, the lead salts of dinitrosalicylic acid, tetrazene and its salts, the salts of nitro-tetrazole, azo tetrazole and diazo-amino-tetrazole, lead nitrato-hypophosphite, nitrosoguanidine, and lead dinitrophenyl azide; any one or more of the common oxidizers, including one or more of the usual chlorates, perchlorates, nitrates, chromates, permanganates, and peroxides; and either with or without the addition of such other fuels as lead sulphocyanate, calcium silicide, antimony sulphide, and zirconium.

Typical priming mixture formulas including a basic simple or double lead salt of 4-nitro phthalic acid are as follows:

|  | Percent | Percent | Percent | Percent | Percent | Percent | Percent | Percent |
| --- | --- | --- | --- | --- | --- | --- | --- | --- |
| Basic simple or double lead salt of 4-nitro phthalic acid | 7 | 8 | 8 | 11 | 9 | 9 | 9 | 5 |
| Calcium silicide |  |  |  |  | 7 | 7 | 8 |  |
| Antimony sulphide | 7 |  |  |  | 14 | 14 |  |  |
| Lead nitrato-hypophosphite |  |  |  |  |  |  |  | 10 |
| Zirconium | 7 |  |  | 5 |  |  |  |  |
| Lead sulphocyanate | 10 |  |  |  |  |  |  |  |
| Guanylnitrosamino-guanyltetrazene | 3 | 2 | 2 | 2 | 3 | 3 |  |  |
| Lead styphnate | 27 | 40 | 40 | 38 | 27 | 27 | 20 | 28 |
| Mercury fulminate |  |  |  |  |  |  | 20 |  |
| Lead nitrate |  | 30 |  |  | 40 |  |  | 12 |
| Barium nitrate | 39 |  | 20 | 39 |  | 30 | 36 | 20 |
| Lead peroxide |  |  | 10 | 5 |  | 10 | 7 | 5 |
| Glass |  | 20 | 20 |  |  |  |  | 20 |

The lead salts of 4-nitro phthalic acid and the double salts herein disclosed being entirely new compounds, the appended claims are to be broadly construed.

What is claimed is:

1. A lead salt of 4-nitro phthalic acid.
2. A normal lead salt of 4-nitro phthalic acid.
3. A mono-basic lead salt of 4-nitro phthalic acid.
4. A di-basic lead salt of 4-nitro phthalic acid.
5. A tri-basic lead salt of 4-nitro phthalic acid.
6. A lead double salt of 4-nitro phthalic acid and nitric acid.
7. A deflagrating composition comprising as an ingredient a lead salt of 4-nitro phthalic acid.
8. A deflagrating explosive composition comprising as an ingredient a basic lead salt of 4-nitro phthalic acid.
9. An ammunition priming composition comprising as an ingredient a basic lead salt of 4-nitro phthalic acid.
10. An ammunition priming composition comprising in approximately the specified proportions the following ingredients:

| | Per cent |
| --- | --- |
| Guanylnitrosaminoguanyltetrazene | 2 |
| Lead styphnate | 40 |
| A basic lead salt of 4-nitro phthalic acid | 8 |
| Lead nitrate | 30 |
| Glass | 20 |

11. A deflagrating explosive composition comprising as an ingredient a double salt consisting of basic lead 4-nitro phthalate and lead nitrate.
12. A deflagrating explosive composition comprising as an ingredient a double salt consisting of di-basic lead 4-nitro phthalate and lead nitrate.
13. A deflagrating explosive composition comprising as an ingredient a double salt consisting of tri-basic lead 4-nitro phthalate and lead nitrate.
14. An ammunition priming composition comprising in approximately the specified proportions the following ingredients:

| | Per cent |
|---|---|
| Guanylnitrosaminoguanyltetrazene | 2 |
| Lead styphnate | 40 |
| A double salt comprising basic lead 4-nitro phthalate and lead nitrate | 8 |
| Lead nitrate | 30 |
| Glass | 20 |

15. A double salt consisting of di-basic lead 4-nitro phthalate and lead nitrate.

16. A double salt consisting of tri-basic lead 4-nitro phthalate and lead nitrate.

WILLI BRÜN.